(12) United States Patent
Ishii et al.

(10) Patent No.: US 7,437,068 B2
(45) Date of Patent: Oct. 14, 2008

(54) OPTICAL COMMUNICATION LINK

(75) Inventors: Yorishige Ishii, Yamatotakada (JP); Toshihiro Tamura, Nara-ken (JP)

(73) Assignee: Sharp Kabushiki Kaisha, Osaka (JP)

(*) Notice: Subject to any disclaimer, the term of this patent is extended or adjusted under 35 U.S.C. 154(b) by 1005 days.

(21) Appl. No.: 10/245,773

(22) Filed: Sep. 17, 2002

(65) Prior Publication Data

US 2003/0072061 A1    Apr. 17, 2003

(30) Foreign Application Priority Data

Sep. 18, 2001    (JP) .............................. 2001-283602

(51) Int. Cl.
*H04B 10/08* (2006.01)
*H04B 10/12* (2006.01)
*H04B 10/00* (2006.01)

(52) U.S. Cl. .................. 398/28; 398/142; 398/148; 398/158

(58) Field of Classification Search .................. 398/25, 398/28, 141, 142, 147, 148, 149, 158

See application file for complete search history.

(56) References Cited

U.S. PATENT DOCUMENTS

| 4,128,759 | A  | * | 12/1978 | Hunt et al.   | 398/161 |
| 6,212,311 | B1 | * | 4/2001  | Tomita        | 385/24  |
| 6,246,499 | B1 |   | 6/2001  | Kunito et al. | 359/161 |

FOREIGN PATENT DOCUMENTS

JP    10-41896    2/1998

* cited by examiner

*Primary Examiner*—Dalzid Singh
(74) *Attorney, Agent, or Firm*—Edwards Angell Palmer & Dodge LLP; David G. Conlin; William J. Daley, Jr.

(57) ABSTRACT

An optical communication link has a plurality of light emitting elements and a plurality of light receiving elements associated with the respective light emitting elements, and a plurality of optical fibers each for conveying an optical signal emitted from one light emitting element to an associated light receiving element. The optical fibers have respective lengths that include at least two different lengths, and respective transmission losses per unit length that vary according the lengths of the optical fibers, so that variation of the transmission losses among the optical fibers due to difference in optical fiber length is prevented.

19 Claims, 12 Drawing Sheets

|  |  | MAX. INPUT INTENSITY OF PD | MIN. INPUT INTENSITY OF PD |
|---|---|---|---|
|  |  | 1 m | 50 m |
| LD OUTPUT FROM OPTICAL SYSTEM | 0 dBm | 0 | 0 |
| TRANSMISSION COUPLING EFFICIENCY | 0 – -2 dB | 0 | -2 |
| TRANSMISSION LOSS OF POF | 0.15–0.3 dB/m | -0.15 | -15 |
| RECEPTION COUPLING EFFICIENCY | -3 – -5 dB | -3 | -5 |
| INPUT LIGHT AMOUNT OF PD | dBm | -3.15 | -22 |

|  |  | MAX. INPUT INTENSITY OF PD | MIN. INPUT INTENSITY OF PD |
|---|---|---|---|
|  |  | 1 m | 50 m |
| LD OUTPUT FROM OPTICAL SYSTEM | 0 dBm | 0 | 0 |
| TRANSMISSION COUPLING EFFICIENCY | 0 - -2 dB | 0 | -2 |
| TRANSMISSION LOSS OF POF | 6-7.5 dB/m<br>0.15-0.3 dB/m | -6 | -15 |
| RECEPTION COUPLING EFFICIENCY | -3 - -5 dB | -3 | -5 |
| INPUT LIGHT AMOUNT OF PD | dBm | -9 | -22 |

OPTICAL COMMUNICATION LINK

BACKGROUND OF THE INVENTION

The present invention relates to an optical communication link for sending and receiving an optical signal by using an optical fiber. More particularly, the present invention relates to an optical communication link applicable to in-home communication, communication between electronic devices, and a LAN (Local Area Network) by using a multi-mode optical fiber such as a POF (plastic optical fiber) as a transmission medium.

Normally, in optical fiber transmission, the optical intensity of a light emitting element is set to a value at which with a longest optical fiber having a maximum transmission loss, a photodiode (hereinafter referred to as PD) serving as a light receiving element can detect more than a minimum amount of light which satisfies a predetermined S/N ratio.

In such a method, the light emitting element such as a semiconductor laser (hereinafter referred to as LD) is driven at a considerably high emission intensity in anticipation of a maximum loss of the longest optical fiber.

However, in transmitting the optical signal in different distances by using the LAN, it is necessary to consider the case where the transmission distance is short and a transmission loss in the optical fiber is low. Also, in the case where the optical fiber is used in the in-home LAN, it is necessary to cover a wide range of 1 m to 50 m.

The use of the POF is considered in the In-home LAN. The POF has a comparatively large transmission loss. In the range of 1 m to 50 m, the transmission loss of the POF fluctuates in the range of 0.1 dB to 15 dB, including a variation of a light source. In such a case, in a light-receiving system constructed of a PD and an I-V (current-voltage) conversion amplifier (pre-amplifier), it is necessary to secure a considerably large dynamic range.

To solve the problems, generally, in an optical communication module sending and receiving an optical signal by using an optical fiber as a transmission medium, after an optical output emitted from the optical fiber is measured, the optical output is fed back to the associated light emitting element such as an LED or an LD as a method of compensating fluctuations of photocurrent of the PD owing to different lengths of the optical fibers.

As an example, in Japanese Patent Application Laid-Open No. 10-41896, there is disclosed a method of feeding back the difference between a certain reference level and a level of light emitted from the optical fiber to an APC (Auto Power Control) of a driving circuit of the LD. The schematic construction of an optical communication link adopting the method will be described below with reference to FIG. 19.

In the optical communication scheme shown in FIG. 19, a PD 108 receives a laser beam sent from a counterpart. After an amplifier 109 amplifies an output signal of the PD 108, a peak hold section 110 detects the output signal. A differential amplifier 111 computes the difference between an output signal of the peak hold section 110 and a reference level (Rx. Ref) and outputs the difference to an APC 105 through a selector 112. On the other hand, a part of laser beams outputted from an LD 101 is incident on a PD 104. A signal corresponding to the incident beam is outputted to the APC 105 from the PD 104.

In correspondence to the output signal of the PD 104 and the signal outputted from the differential amplifier 111, the APC 105 supplies an LD actuator 102 with a control signal. The LD actuator 102 amplifies transmission data in correspondence to the control signal outputted thereto from the APC 105 and drives the LD 101. This is the method of solving the above problem.

However, the method of utilizing the feedback has a problem that because the feedback circuit itself is complicated and expensive, the cost of the optical communication link is high. In addition, if an LD is used as a light emitting element, the lower limit of the output is, disadvantageously, restricted by an extinction ratio, and the upper limit of the output is also restricted in consideration of the characteristic, life, and safety of a transmitter.

As described above, in the case where POFs are used for the LAN at home, the transmission loss is comparatively high. In the range of transmission distance of 1-50 m, the transmission loss fluctuates in the range of 0.1 dB (min.) to 15 dB (max.), including fluctuations of light sources. Thus, in the light-receiving system constructed of a PD and an I-V conversion amplifier, it is necessary to secure considerably large dynamic range. Therefore it is impossible to cope with variations in a sending system by merely altering the design of an ordinary optical system.

In particular PDs are requested to have large dynamic range in dependence on variations of light sources, or light emitting elements, to be used in a sending apparatus, variations of excitation NA, and difference in lengths of optical fibers. There may be an extreme case in which optical communication cannot be executed.

SUMMARY OF THE INVENTION

The present invention has been made to solve the problems. Therefore, it is an object of the present invention to provide an optical communication link capable of adjusting the level of an output from an optical fiber at a low cost without adjusting a sending circuit or the like so that various lengths of the optical fibers are covered when identical light receiving elements (PD) and identical pre-amplifiers are used in the optical communication link.

In order to accomplish the above object, an optical communication link according to the present invention has a plurality of light emitting elements and a plurality of light receiving elements associated with the respective light emitting elements, and a plurality of optical fibers each for conveying an optical signal emitted from one light emitting element to an associated light receiving element. The optical fibers have respective lengths that include at least two different lengths. And, the optical fibers have respective transmission losses per unit length that vary according the lengths of the optical fibers.

Optical fibers having different lengths may have different transmission losses per unit length. Alternatively, optical fibers having different lengths that fall within different ranges have different transmission losses per unit length. In the latter case, optical fibers having lengths that fall within the same range, even if they are different, have substantially the same identical transmission loss per unit length.

According to the present invention, transmission losses of each of the optical fibers obtained by multiplying the length of the optical fiber by the corresponding transmission loss per unit length are allowed to fall within an identical specified range. Thus, variation or fluctuation of optical output owing to difference in optical fiber length is suppressed. Therefore it is possible to use the dynamic range of a receiver effectively.

The transmission losses per unit length of the optical fibers may increase with increase in transmission distance.

In one embodiment, the transmission losses of each of the optical fibers are adjusted so as to fall within the range of 6-15 dB. Thus, it is possible to effectively suppress fluctuations of the optical output owing to the different lengths of the optical fibers.

In one embodiment, at least one of the optical fibers has an element or a structure for adding a transmission loss thereto at an end or between opposite ends thereof.

The element or structure for adding a transmission loss may comprise an attenuation filter made of polyimide resin and provided at the end of the optical fiber.

Alternatively, the element or structure for adding a transmission loss may comprise an attenuation portion provided between the opposite ends of the optical fiber, said attenuation portion having a core diameter smaller than that of the other parts of the optical fiber.

As another alternative, the element or structure for adding a transmission loss may comprise an attenuation portion provided between the opposite ends of the optical fiber, said attenuation portion having a gradually reducing fiber diameter.

In the case where plastic optical fibers are used for the optical communication link of the present invention, it is possible to artificially change their transmission losses to desired values because of reasons described later. Therefore the optical communication link having the above characteristics can be easily produced. Further the manufacturing cost is reduced. Thereby it is possible to popularize the optical communication link.

There is also provided, according another aspect of the present invention, an optical communication link comprising:

a plurality of light emitting elements and a plurality of light receiving elements associated with the respective light emitting elements; and a plurality of optical fibers each for conveying an optical signal emitted from one light emitting element to an associated light receiving element;

said optical fibers having respective lengths that include at least two different lengths, wherein an end of a first optical fiber having a smaller length is at a longer distance from an associated light emitting element or light receiving element than an end of a second optical fiber having a larger length is.

With this arrangement, for each of different lengths of optical fibers to be used, the coupling loss between the optical fiber and the associated light emitting and/or receiving element is adjusted by changing the distance between an end surface of the optical fiber and the light emitting element and/or the distance between the other end surface of the optical fiber and the light receiving element. Increasing such a distance, which increases the coupling loss, has an effect equivalent to the effect of providing the attenuation filter at an end portion of the optical fiber. Thus, by adjusting the distances, variation or fluctuation of optical output owing to the difference in length of the optical fibers is suppressed.

In one embodiment, the optical communication link further has plugs mounted around the optical fibers at each of end portions thereof, each plug having a connection portion. The optical communication link also has receptacles for receiving the respective connection portions of the plugs therein. Each receptacle supports an associated light emitting or receiving element such that when the connection portions of the plugs are received in the respective receptacles, the ends of the fibers are opposed to the associated light emitting or receiving elements. And, the connection portion of at least one of the plugs mounted around the first optical fiber has a length smaller than that of the connection portion of the plug mounted around the second optical fiber.

In this embodiment, adjustment of the distance between the end surface or surfaces of the optical fiber and the light emitting and/or receiving element is achieved by changing the length of the connection portion of the plug.

Other objects, features and advantages of the present invention will be apparent from the following description.

BRIEF DESCRIPTION OF THE DRAWINGS

The present invention will become more fully understood from the detailed description given hereinbelow and the accompanying drawings which are given by way of illustration only, and thus are not intended to limit the present invention, and therein.

DETAILED DESCRIPTION OF THE PREFERRED EMBODIMENTS

The embodiments of the present invention will be described below with reference to the drawings.

First Embodiment

A first embodiment of the optical communication link of the present invention will be described below with reference to FIGS. 1 through 4.

Figure 1:
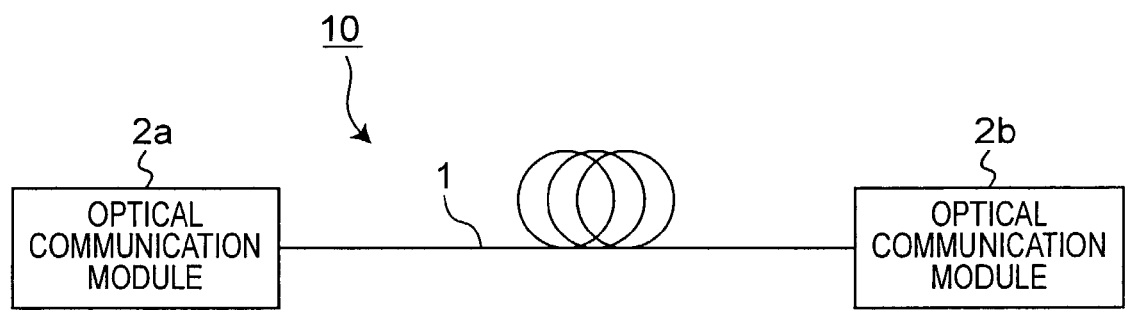
FIG. 1 is a schematic view showing the construction of an optical communication link to which the present invention is applied.

FIG. 1 schematically shows the construction of the first embodiment of the optical communication link of the present invention.

The optical communication link 10 has an optical fiber (POF) 1 for conveying light modulated based on a data signal to be transmitted, and optical communication modules 2a and 2b connected to the optical fiber 1 in such a way as to be optically coupled to respective ends of the optical fiber 1.

Figure 2:
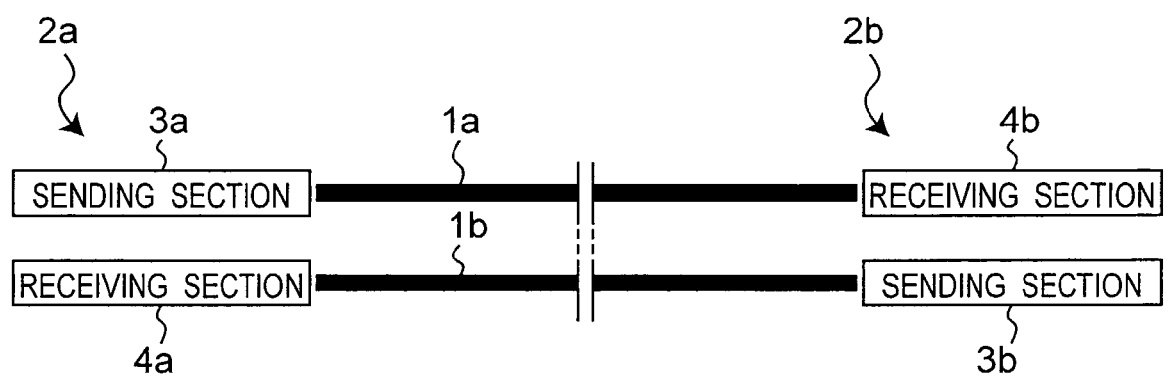
FIG. 2 is an explanatory view showing in more detail the optical communication link to which the present invention is applied.

As shown in FIG. 2, the optical communication module 2a has a sending section 3a having a light emitting element (LD or LED) and a receiving section 4a having a light receiving element (PD). The other optical communication module 2b also has a sending section 3b having a light emitting element (LD or LED) and a receiving section 4b having a light receiving element (PD).

The sending section 3a of the optical communication module 2a is connected to the receiving section 4b of the counterpart optical communication module 2b through an optical fiber 1a. The receiving section 4a of the optical communication module 2a is connected to the sending section 3b of the counterpart optical communication module 2b through an optical fiber 1b.

In the embodiment shown in FIG. 2, a two-way communication is performed by using the optical fibers 1a and 1b. However, there is no problem in applying the present invention to an optical communication link for conducting a two-way communication by using one optical fiber.

An example of the two-way communication is shown in the embodiment of FIG. 2. However, there is no problem in applying the present invention to an optical communication link constructed of the sending section 3a, the optical fiber 1a, and the receiving section 4b for carrying out a one-way communication.

The embodiment of the present invention will be described below in more detail.

In the case where the optical communication link is utilized as a home link, POFs are frequently used because of their easy connection and joint. It is considered that a maximum length of 50 meters of the fiber is necessary for connecting in-home communication modules to each other without a repeater. On the other hand, as a measure against an electronic noise or the like, a POF having a length of 1 meter may be used. Therefore it is necessary to cover the range of a short distance of 1 meter to a long distance of 50 meters.

Figure 3:
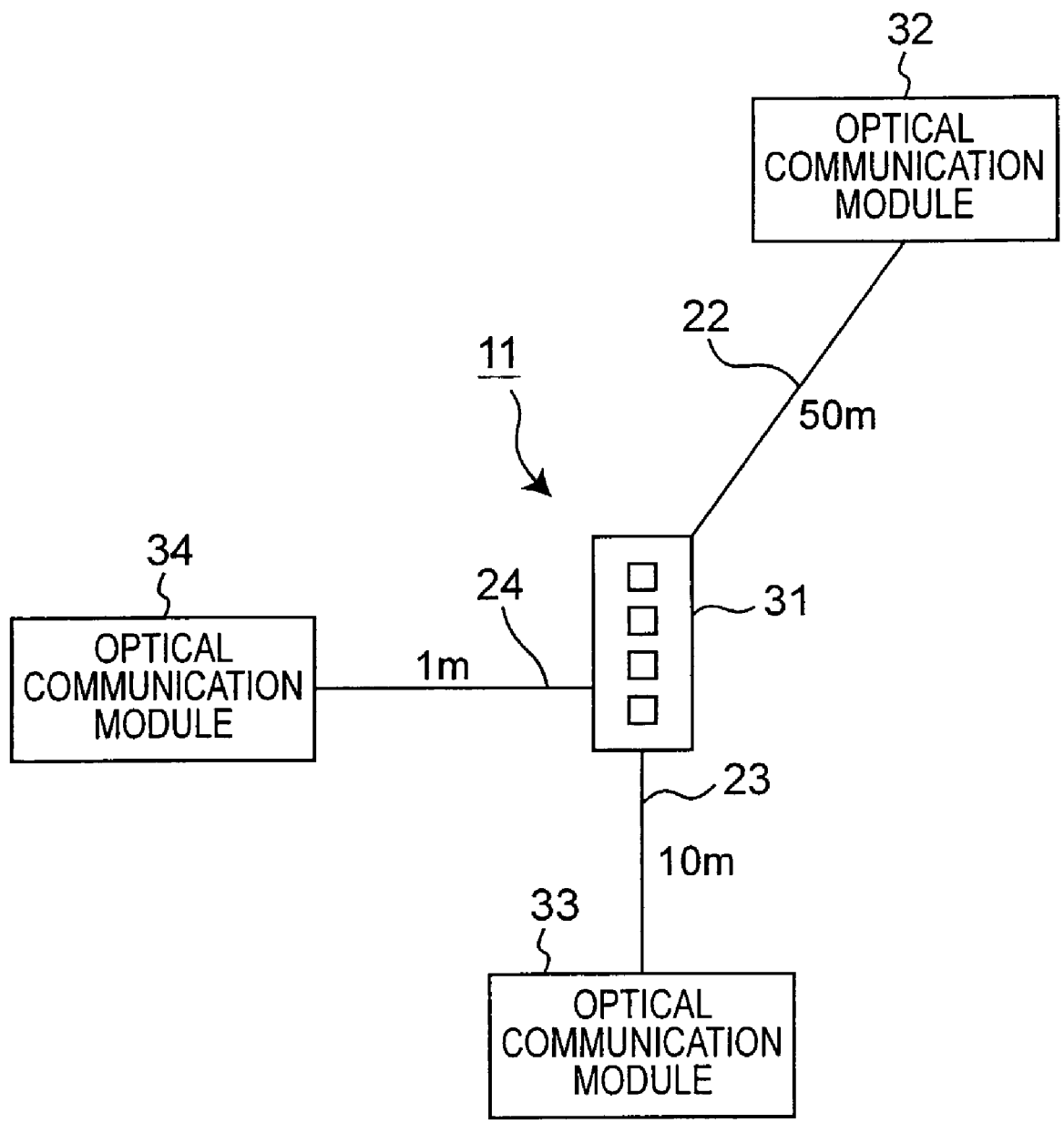
FIG. 3 is a schematic view showing the construction of a home link to which the present invention is applied.

FIG. 3 shows an example of a home link having such a construction.

A home link 11 shown in FIG. 3 has a repeater 31, an optical communication module 32 spaced at 50 meters from the repeater 31 and connected thereto through a POF 22, an optical communication module 33 spaced at 10 meters from the repeater 31 and connected thereto through a POF 23, and an optical communication module 34 spaced at 1 meter from the repeater 31 and connected thereto through a POF 24. The repeater 31 and each optical communication module 32, 33, 34 have light emitting and receiving elements.

Figures 4, 5:
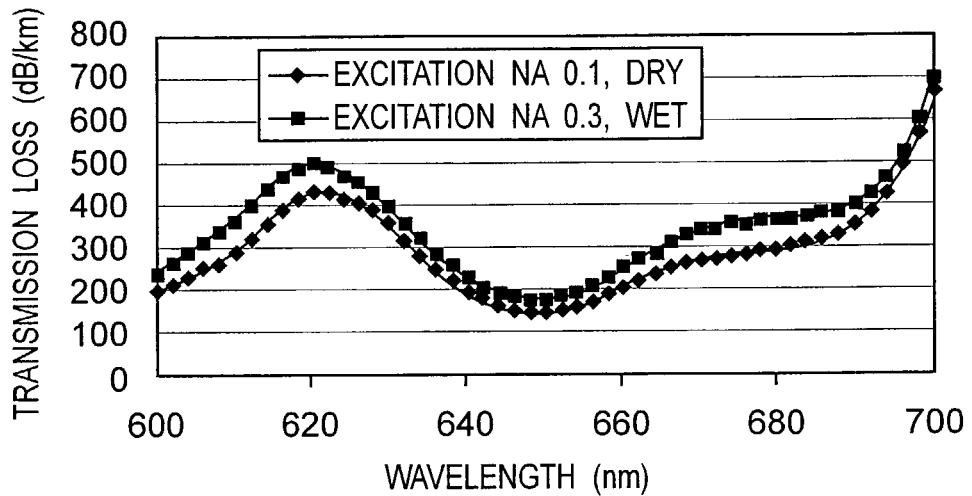
FIG. 4 is a graph showing an example of a transmission loss characteristic of an optical fiber that depends on the light source wavelength.
FIG. 5 shows an example of an estimation of a transmission loss in the case where the present invention is not applied to the home link shown in FIG. 3.

FIG. 4 shows an example of the relationship between transmission wavelength and transmission loss in the case where a POF is used.

As shown in FIG. 4, the POF has a large transmission loss with respect to a wavelength. Therefore, for example, in the case where an ordinary optical fiber having a transmission loss of 0.15 dB/m is used, it is necessary to estimate a transmission loss in the range of 0.15 dB (1 m) to 7.5 dB (50 m). The estimated transmission loss is based on a supposition that the wavelength of a light source at a sending side is stable at 650 nm. Actually, however, an ordinary LD, for example, usually has a set wavelength ±15 nm (inclusive of a wavelength variation owing to temperature changes).

For example, in the case where a red laser (product No.: CLS0765) produced for DVD by Sharp K. K. is used, there is a variation of 635-665 nm in its output wavelength. With such a variation, a maximum transmission loss of the POF at 50 m is 15 dB. In the case where an LED is used as a light source, the wavelength fluctuates more than that. In this case, it is necessary to estimate a larger transmission loss.

If the transmission loss is covered in only the range of 0.15-15 dB, an optical signal can be reliably received by a receiving system constructed of a pre-amplifier and a PD for high speed communication which can receive the optical signal up to 500 Mbps that is considered necessary in the in-home communication.

However, the coupling efficiency of the light sent from a transmitter to the optical fiber fluctuates in dependence on reflection of the light and variations in products. The coupling efficiency of the amount of light sent from the optical fiber to a receiver also fluctuates in dependence on variations in assembly and a deviation of an optical axis. Further even though an APC drive is used, the amount of the transmitted light fluctuates in dependence on temperatures.

From the above factors, the coupling loss combined with the variation of the light amount at the sending side is estimated as at least 0-2 dB, and the coupling loss at the receiving side is estimated as at least 3-5 dB. As described above, the maximum loss of the POF is 15 dB. Thus the total maximum transmission loss is 22 dB.

Regarding the optical output of the transmitter, in consideration of safety for the eyes, generally, the amount of light having a wavelength of 650 nm is set at 0 dBm or less regardless of whether the LD or the LED is used. Thus, as shown in FIG. 5, the amount of light incident on the PD at a maximum loss is:

0 dBm−22 dB=−22 dBm

At a transmission speed of about 100 Mbps, the value does not have a problem as a minimum received light amount in consideration of the S/N ratio. However, at a transmission speed of more than 400 Mbps, it is difficult to secure a necessary S/N ratio owing to an increase of noise caused by an increase of bands.

The amount of light incident on the PD at a minimum loss, namely, at the time of taking the shortest distance of 1 meter and the lower limit value of the variation of the loss, is found as follows in a similar calculation.

0 dBm−0.15 dB (transmission loss)−3 dB (coupling loss in both sending and reception sides)−0 dBm (variation in coupling loss)=−3.15 dBm (see FIG. 5)

In this case, there is a possibility of an overflow in the receiver.

Figure 6:
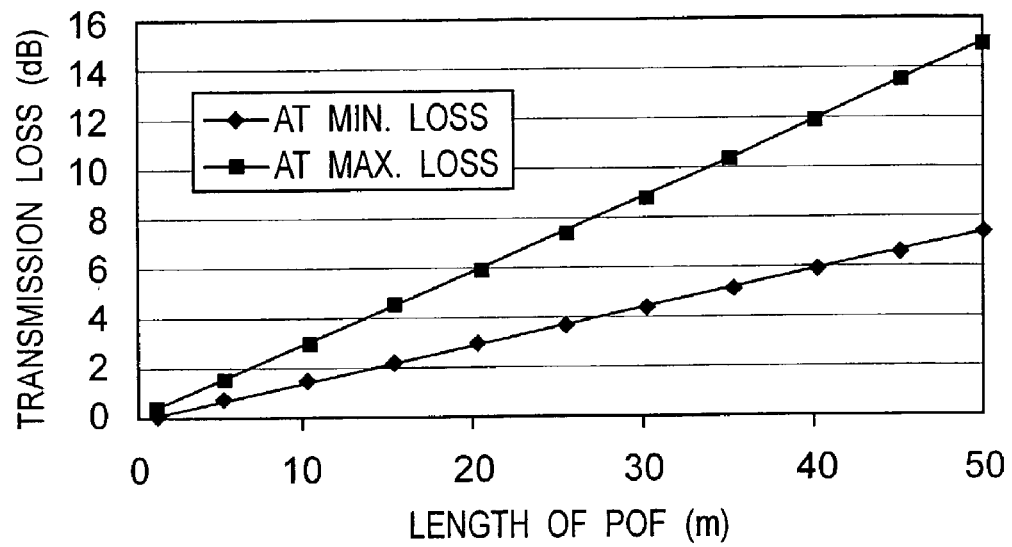
FIG. 6 is a graph showing an example of a transmission loss characteristic of an optical fiber that depends on the transmission distance.

FIG. 6 shows a comparison between a maximum transmission loss and a minimum transmission loss with respect to the length of the POF.

As described above, at the maximum loss, the S/N ratio deteriorates owing to shortage of the amount of light incident on the PD. At the minimum loss, an overflow occurs owing to excess of the amount of light incident on the PD. The problem is that the shortage and excess of the amount of light occur in the same optical communication link.

To solve the problem, in the present invention, a POF having a characteristic (characteristic as shown in FIG. 6) that its transmission loss per unit length is uniform is not used, but the transmission loss of the POF of the present invention is different according to the length (transmission length) thereof.

Figure 7:
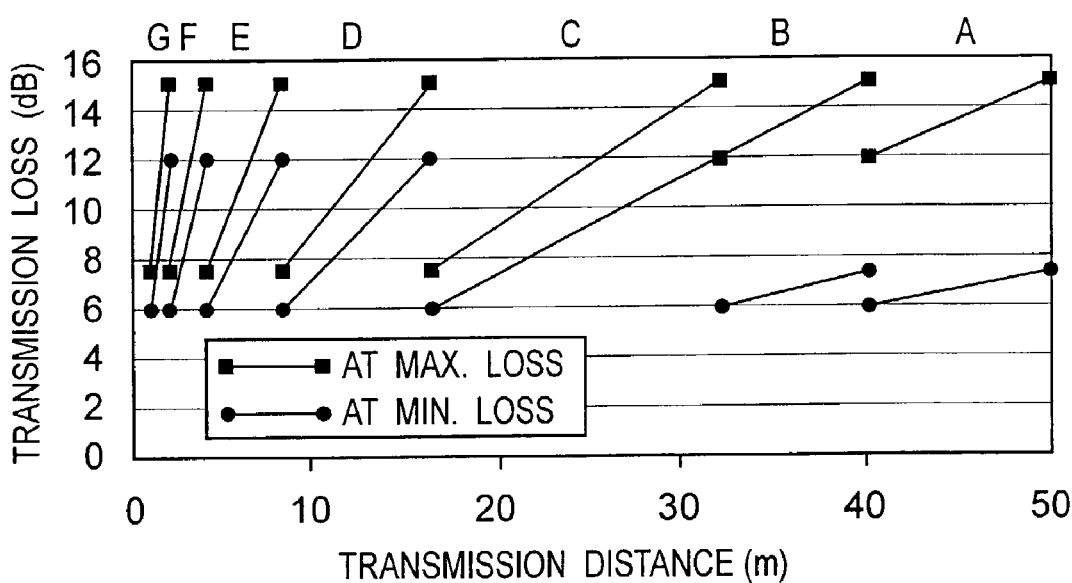
FIG. 7 is a graph showing an example of a transmission loss characteristic of an optical fiber, for each transmission distance, which is applied to the optical communication link of the present invention.

For example, POFs having a loss characteristic as shown in FIG. 7 are used in the present invention to forcibly increase the loss of shorter POFs. Thereby the loss variation among the POFs having lengths in the range of 1-50 meters can be suppressed to 6-15 dB.

Figures 8, 9:
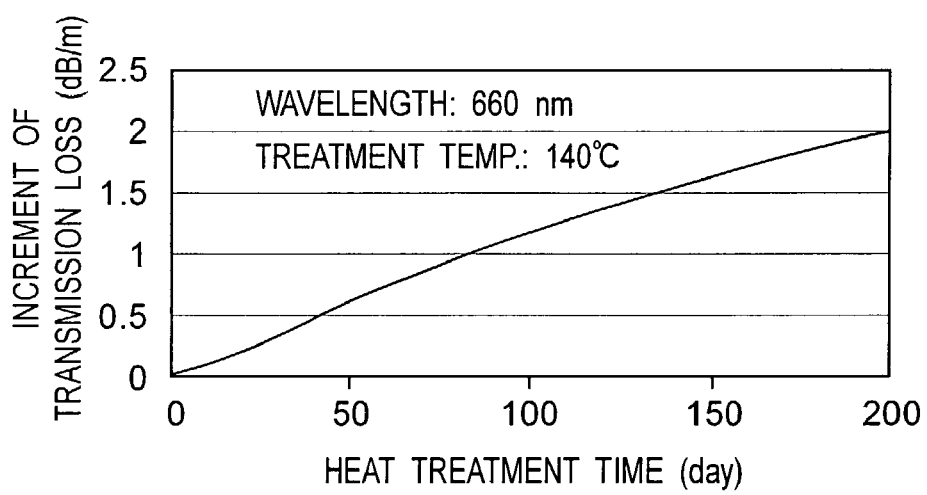
FIG. 8 shows an example of an estimation of a transmission loss in the case where the present invention is applied to the home link shown in FIG. 3.
FIG. 9 is a graph showing an example of an increase amount of the transmission loss of a POF when the POF is heat-treated.

As shown in FIG. 8, when a POF having the shortest distance is used to allow its minimum loss to be 6 dB, the amount of light incident on the PD is as follows:

0 dBm−0 dB (coupling loss at sending side)−6 dB (transmission loss)−3 dB (coupling loss at receiving side)=−9 dBm There is no possibility of an overflow in the receiver.

The maximum loss of 22 dB is not different from the estimated transmission loss shown in FIG. 5. But the minimum loss is 9 dB. Thus the receiver has an increased margin in its dynamic range.

POFs may be given the transmission characteristics as shown in FIG. 7 by increasing the transmittance of the POFs having the transmission characteristic as shown in FIG. 6 in proportion to the length thereof. However, generally, optical fibers are produced in such a way as to have technically maximum transparency. Thus in the embodiment, larger losses are imparted forcibly to POFs having shorter transmission distances.

That is, in the embodiment, an optical fiber having a normal transmission loss is used for a longest transmission distance, and an optical fiber having a larger loss is used for a shorter transmission distance. The optical communication link having such a construction is inexpensive.

The methods of increasing the loss of the POF will be described below.

A first method of increasing the transmission loss is to utilize a phenomenon that the transmittance of the POF is decreased by heat treatment. FIG. 9 shows to what extent the heat treatment increases the transmission loss.

When the ordinary POF having a transmission loss of 0.15 dB/m is heat-treated at 140° C. for 50 days, the transmission loss increases by 0.6 dB/m. Thus the transmission loss of the POF becomes 0.75 dB/m. The lower a heat treatment temperature is, the less the increment of the transmission loss of the POF is. The higher the heat treatment temperature is, the more the increment of the transmission loss is. Thus to enhance productivity, it is preferable to heat-treat the POF at a high temperature.

Applying the method of increasing the transmission loss by heat treatment to FIG. 7, the interval of A has a normal state. Thus no heat treatment is conducted. Because the interval B has a transmission loss of about 0.19 dB/m, the POF is heat-treated at about 140° C. for about four days. Because the interval C has a transmission loss of about 0.38 dB/m, the POF is heat-treated at about 140° C. for about 20 days. Because the interval D has a transmission loss of about 0.75 dB/m, the POF is heat-treated at about 140° C. for about 50 days. Because the interval E has a transmission loss of about 1.5 dB/m, the POF is heat-treated at about 140° C. for about 120 days. In this manner, a necessary transmission loss is imparted to the POF.

On the other hand, in the ranges of F and G of FIG. 7 in which a considerably large loss is required, the heat treatment at the temperature of 140° C. will take too long, which poses a problem of a low productivity. Thus, in such a case, the heat treatment of the POF should be performed at a higher temperature to enhance productivity. That is, as described above, the lower a heat treatment temperature is, the less the increment of the transmission loss is. The higher the heat treatment temperature is, the more the increment of the transmission loss is. Thus it is possible to impart the POF a larger loss in a short period of time by heat-treating the POF at a higher temperature.

Another method of increasing the transmission loss of optical fibers uses materials of different transmittances. For example, as a material for the core, high-grade PMMA (polymethyl methacrylate) having a high transmittance is used for a long distance (50 meters) transmission. Intermediate-grade PMMA is used for an intermediate distance (10 meters) transmission. Low-grade PMMA is used for a short distance (1 meter) transmission.

In the above example, the material of the core is altered such that the optical fiber has a larger loss for a shorter transmission distance. Alternatively, material for the cladding maybe altered. It is also possible to alter a transmission loss amount by adding to the core a substance which reduces the transmittance of the POF.

Figure 10:
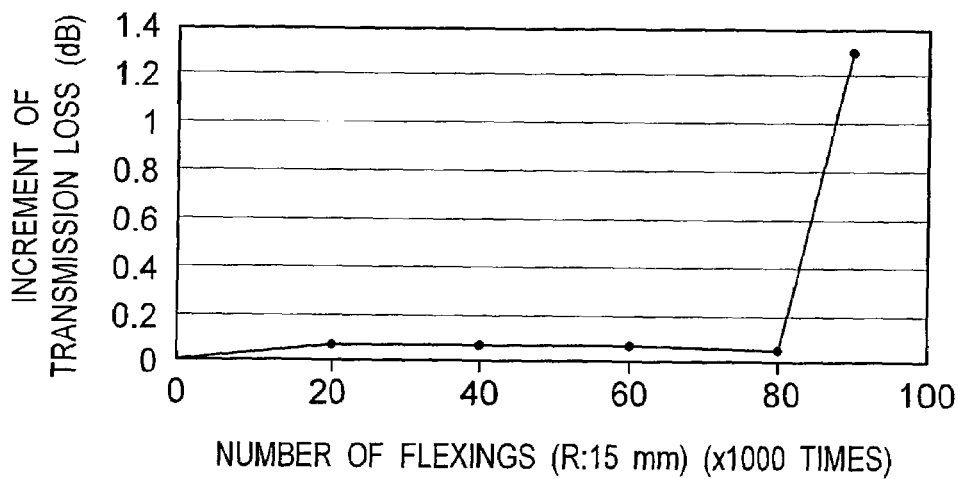
FIG. 10 is a graph showing an example of an increase amount of the transmission loss of a POF when the POF is subjected to repeated flexural stresses.

As shown in FIG. 10, POFs have a property that when a certain stress (flexural stress by repeated bending or flexing) is imparted thereto, their transmission loss increases rapidly. This property may also be utilized to forcibly impart an additional transmission loss to the POF.

Figure 11:
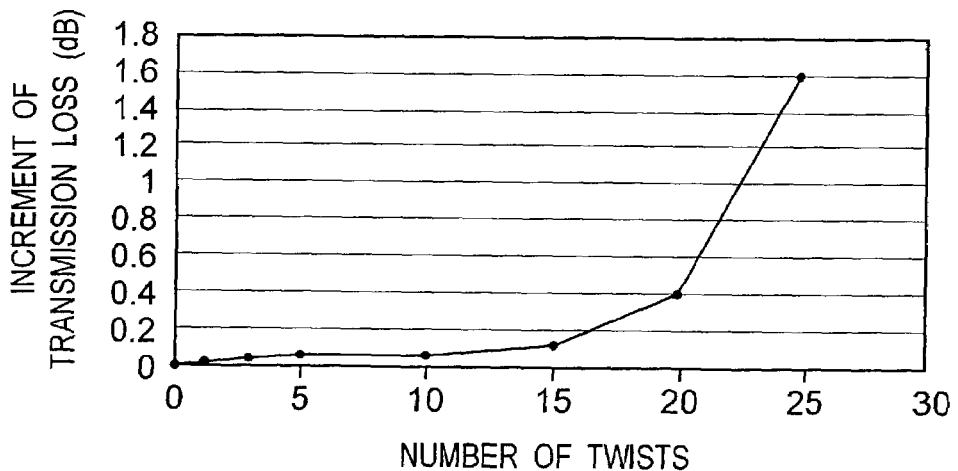
FIG. 11 is a graph showing an example of an increase amount of the transmission loss of a POF when the POF is subjected to torsional stress.
Figure 12:
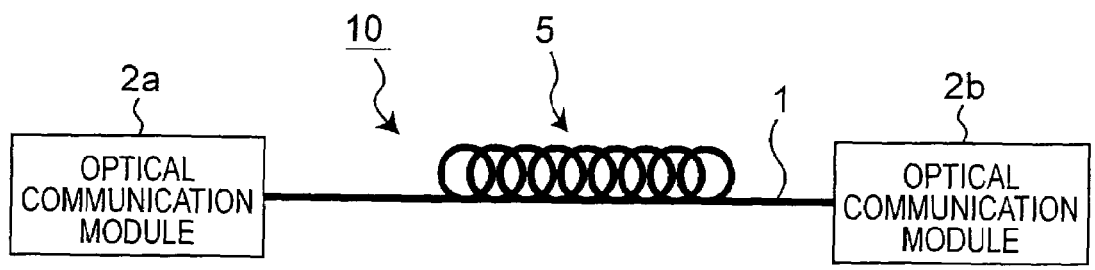
FIG. 12 shows the construction of an optical communication link utilizing an increase of the transmission loss of the POF where the POF is subjected to the torsional stress.

Also, as shown in FIG. 11, POFs have a property that their transmission loss increases when they are twisted. Utilizing this property, a twisted portion (coil) 5 may be provided on the transmission path of the POF 1, as shown in FIG. 12, to thereby forcibly impart an additional transmission loss to the POF.

Figure 13:
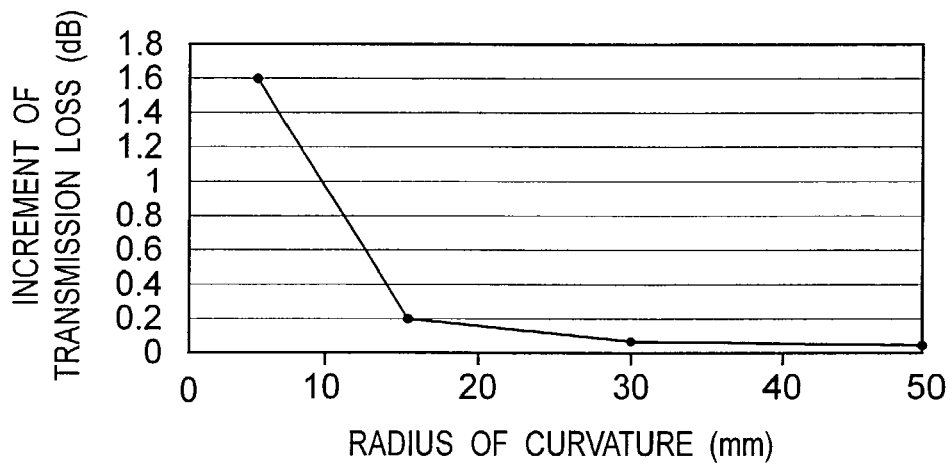
FIG. 13 is a graph showing an example of an increase amount of the transmission loss of the POF when the POF is subjected to stationary flexure.
Figure 14:
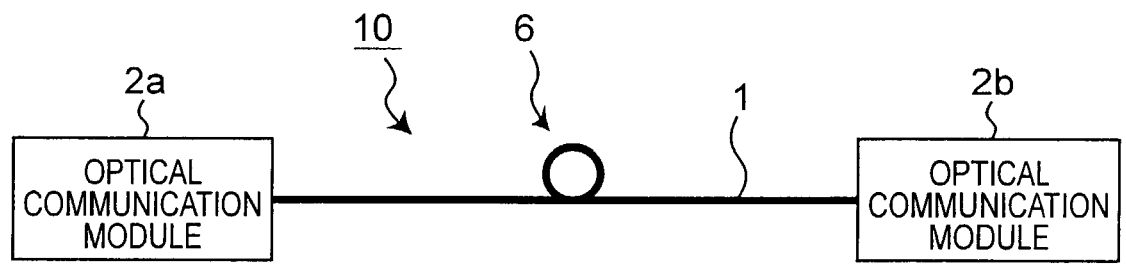
FIG. 14 shows the construction of an optical communication link utilizing the increase of the transmission loss of the POF due to the stationary flexure.

POFs increase their transmission loss when bent at a certain radius of curvature or less, as shown in FIG. 13. By utilizing the property, a bent portion 6 may be provided on the transmission path of the optical fiber (POF) 1, as shown in FIG. 14, to thereby forcibly impart an additional transmission loss to the POF.

Methods of increasing the transmission loss of the POF are not limited to the above-described ones. Other methods can be used. For example, it is also possible to increase the transmission loss of the POF under a particular environment or by irradiating it with radiant rays such as ultraviolet rays or X-rays.

It is difficult to decrease an inherent transmission loss of the POF, whereas it is comparatively easy to increase its transmission loss.

Second Embodiment

In the loss increasing methods adopted in the first embodiment, the additional loss is imparted uniformly to the entire length of a POF to be used. The present invention is not limited to the methods. Alternatively, it is possible to impart the additional loss to the POF at a portion thereof intensively, which will also bring the same effect as a whole of the POF.

Figure 15:
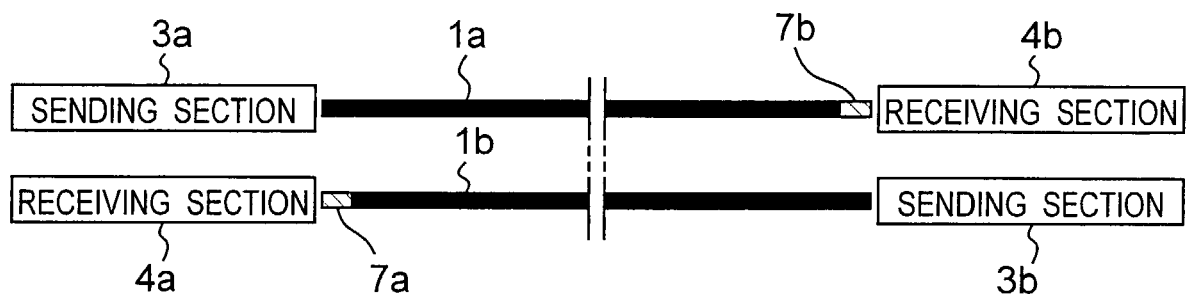
FIG. 15 shows the construction of an optical communication link utilizing an increase of the transmission loss of the POF due to the provision of an attenuation filter.

For example, "PIX 3400" (Hitachi Chemical Co. Ltd.) made of polyimide resin has attenuation characteristic of 6 dB/cm for light having a wavelength of 650 nm. To realize a transmission loss in the interval or range G of FIG. 7, as shown in FIG. 15, attenuation filters 7a and 7b having a thickness of 1 cm made of the PIX 3400 are provided at an end surface of each of optical fibers (POF) 1a and 1b. Thereby a loss of 6 dB is generated at the end surface of each of them. In this way, a situation similar to that in the range of G can be generated. The attenuation filter 7a, 7b may be provided at either of an incoming end or outgoing end of the POF.

Figure 20:
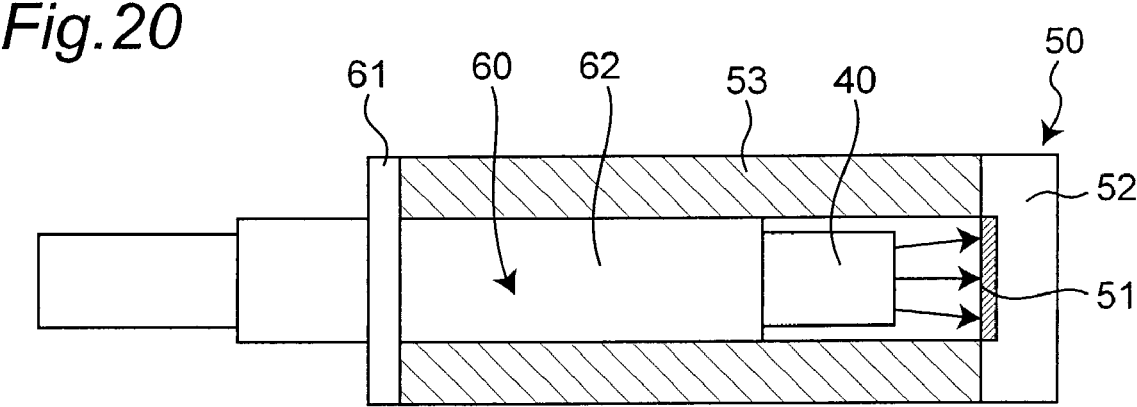
FIG. 20 shows connection between an optical plug for long-distance transmission and a receiving optical communication module.
Figure 21:
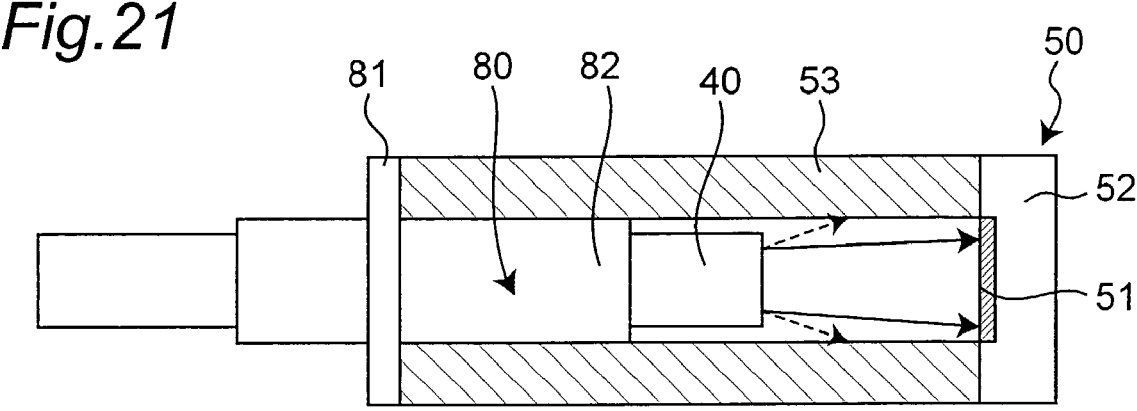
FIG. 21 shows connection between an optical plug for short-distance transmission and a receiving optical communication module.
Figure 22:
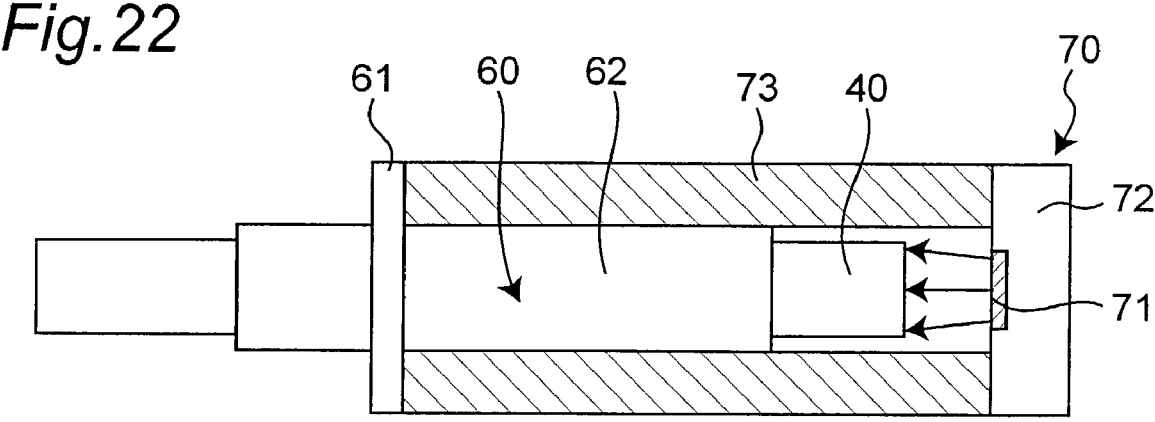
FIG. 22 shows connection between an optical plug for long-distance transmission and a transmitting optical communication module.
Figure 23:
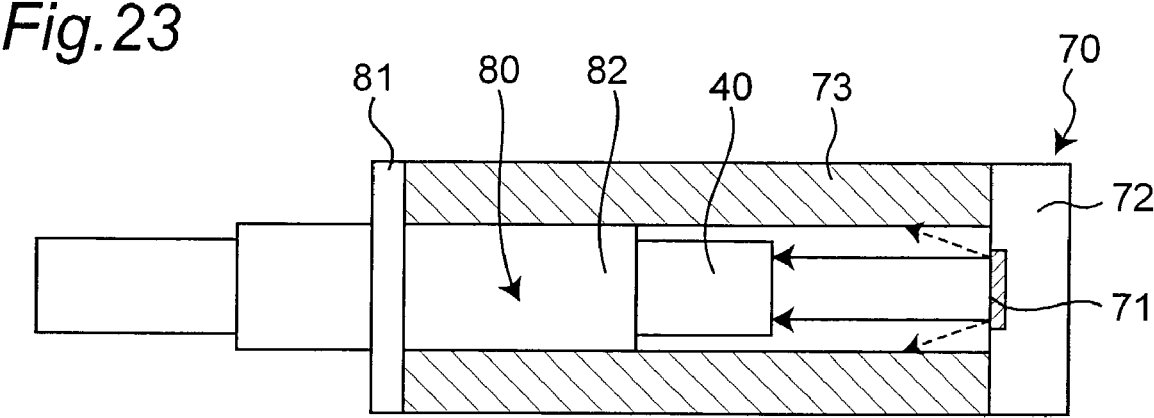
FIG. 23 shows connection between an optical plug for short-distance transmission and a transmitting optical module.

It is also possible to adjust, for each of different lengths of optical fibers to be used, the coupling loss between the optical fiber and the light emitting and/or receiving element by taking measures such as, for example, changing the distance between at least one of the light emitting and receiving elements and a corresponding end face of the optical fiber such that an effect equivalent to the effect of providing the attenuation filter is obtained. FIGS. 20-23 show such an arrangement. FIG. 20 shows that an optical plug 60 for long-distance transmission is connected with a receiving optical communication module 50, while FIG. 21 shows that an optical plug 80 for short-distance transmission is connected with the receiving optical communication module 50. Also, FIG. 22 shows that an optical plug 60 for long-distance transmission is connected with a transmitting optical communication module 70, while FIG. 23 shows an optical plug 80 for short-distance transmission is connected with the transmitting optical module 70.

As shown in FIGS. 20 and 21, the receiving optical communication module 50 essentially consists of a receptacle 53 and a receiver 52 mounted to the receptacle 53. The receiver 52 has a receiving portion 51 including a photodiode as a light receiving element. Similarly, as shown in FIGS. 21 and 23, the transmitting optical communication module 70 essentially consists of a receptacle 73 and a transmitter 72 mounted to the receptacle 73. The transmitter 72 has a transmitting portion 71 including an LD or LED as a light emitting element.

On the other hand, the plugs 60 and 80, through which an optical fiber, such as a POF, is passed, have their respective stoppers 61 and 81 to rest against an end surface of the associated receptacles 53 and 73 when the plugs are placed in position. Reference numerals 62 and 82 denote connection portions of the plugs 60 and 80 that are received in the receptacles 53 and 73. The connection portion 82 of the plug 80 for short-distance transmission is shorter than the portion 62 of the plug 60 for long-distance transmission. Thus, when the plugs 60, 80 with the optical fiber 40 are placed in position, an end surface of the optical fiber 40 projecting from the plug 80 for short-distance transmission is at a larger distance from the light receiving and emitting portions 51, 71, more specifically, from the light receiving and emitting elements than an end surface of the optical fiber 40 projecting from the plug 60 for long-distance transmission is.

With the above arrangement, in the case of short-distance transmission, some components (indicated by arrow-headed broken lines) of light emitted from the optical fiber 40 (FIG. 21) and the light emitting element 71 (FIG. 23) are not coupled to the light receiving portion 51 (FIG. 21) and the end surface of the optical fiber 40 (FIG. 23). That is, coupling loss between the optical fiber 40 and the light receiving and emitting portions 51, 71 takes place, which results in the increase of transmission loss.

In the figures, arrow-headed solid lines represent light components emitted from the optical fiber 40 and light emitting portion 71 and coupled to the associated light receiving portion 51 and optical fiber 40. As is apparent from FIGS. 20-23, more light components are coupled in the long-distance transmission than in the short-distance transmission. The quantity of light components causing the coupling loss is easily adjustable by changing the length of the connection portion of the plug to be accommodated in the receptacle of the optical communication module.

It is to be noted that the adjustment of the coupling loss may be performed at only one end of the optical fiber or both ends thereof.

Figure 16:
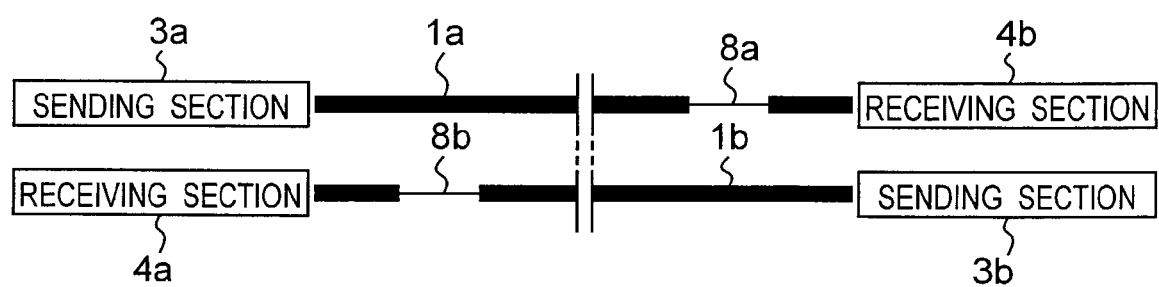
FIG. 16 shows the construction of an optical communication link that increases the transmission loss by utilizing a connection loss which occurs owing to a difference in the diameter of optical fibers.

As shown in FIG. 16, the loss may be imparted to the transmission optical fibers (POF) 1a and 1b by inserting between the incoming and outgoing ends of each of the optical fibers 1a and 1b attenuation optical fibers 8a and 8b whose cores are smaller in the diameter. In this case, supposing that the diameter of each of the transmission optical fibers 1a and 1b is d1 and that the diameter of each of the attenuation optical fibers 8a and 8b is d2, the amount of light attenuates at a rate of $[d2*d2/(d1*d1)]*100\%$.

Figure 17:
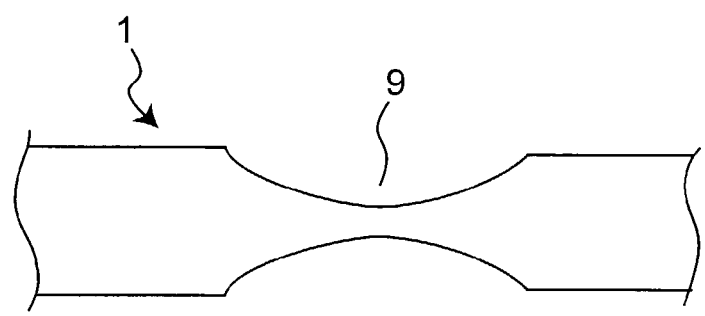
FIG. 17 shows an example of an increase of the transmission loss brought about by partly narrowing the POF.

As shown in FIG. 17, the loss may be imparted to the optical fiber (POF) 1 by gradually reducing its diameter at a certain portion thereof to form an attenuation portion 9. The loss can be also imparted to the optical fiber 1 by peeling off a part of cladding (not shown) thereof.

In the second embodiment, the POFs are used as the optical fibers. However, fibers made of other materials, such as quartz fibers, may also be used as the optical fibers.

Third Embodiment

In the third embodiment, the present invention is applied to an optical communication link wherein sending apparatuses have different light emitting elements and sending/receiving apparatuses have different communication speeds.

In the case where sending/receiving apparatuses S100 (communication speed: 100 Mbps) and S400 (communication speed: 400 Mbps), which are constructed in accordance with the standard of IEEE 1394, are used, a two-way communication is performed at a communication speed of 100 Mbps.

Figure 18:
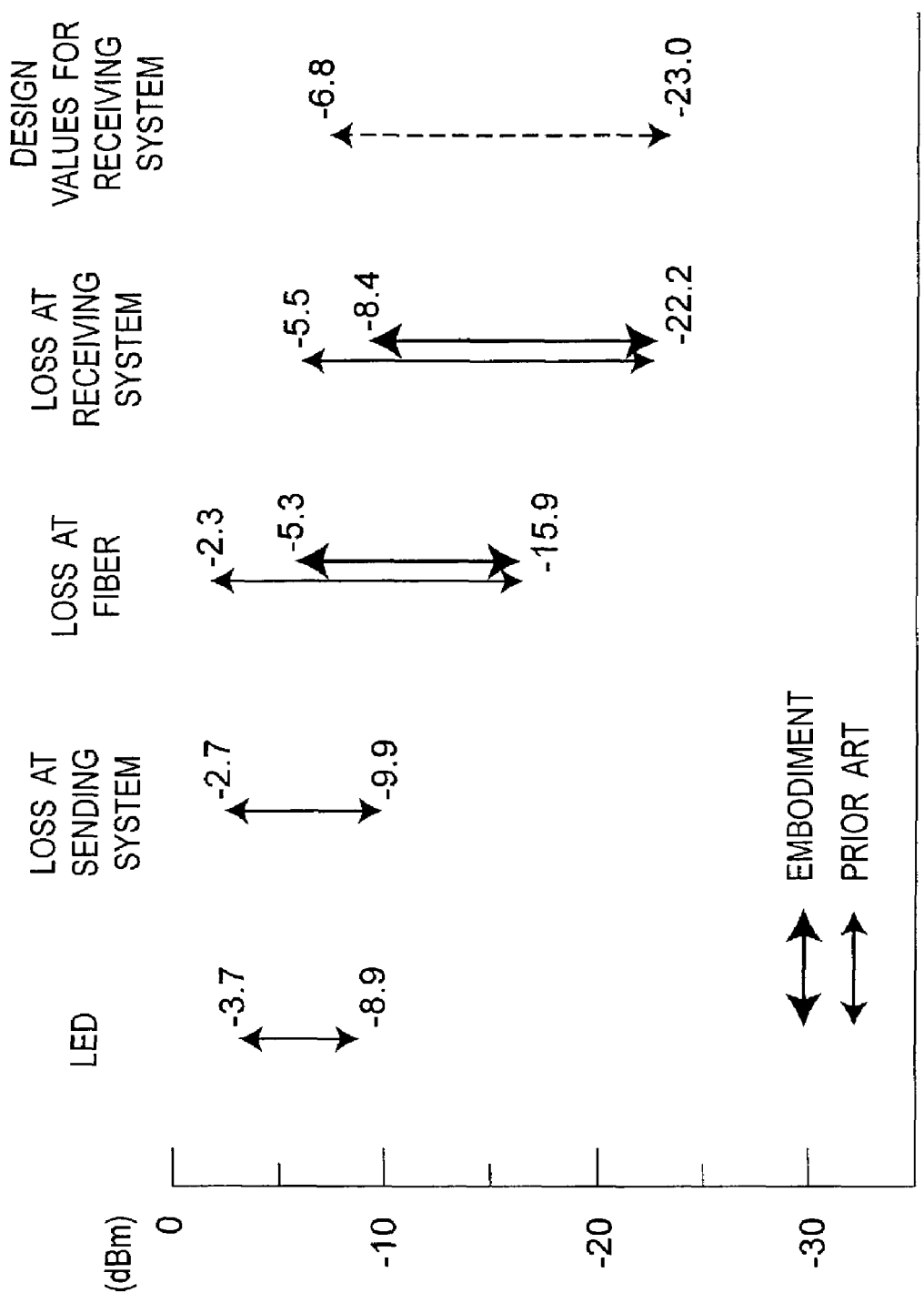
FIG. 18 is a graph showing losses in the range from a sending system to a receiving system both in an optical communication link of an embodiment of the present invention and in a prior art optical communication link.
Figure 19:
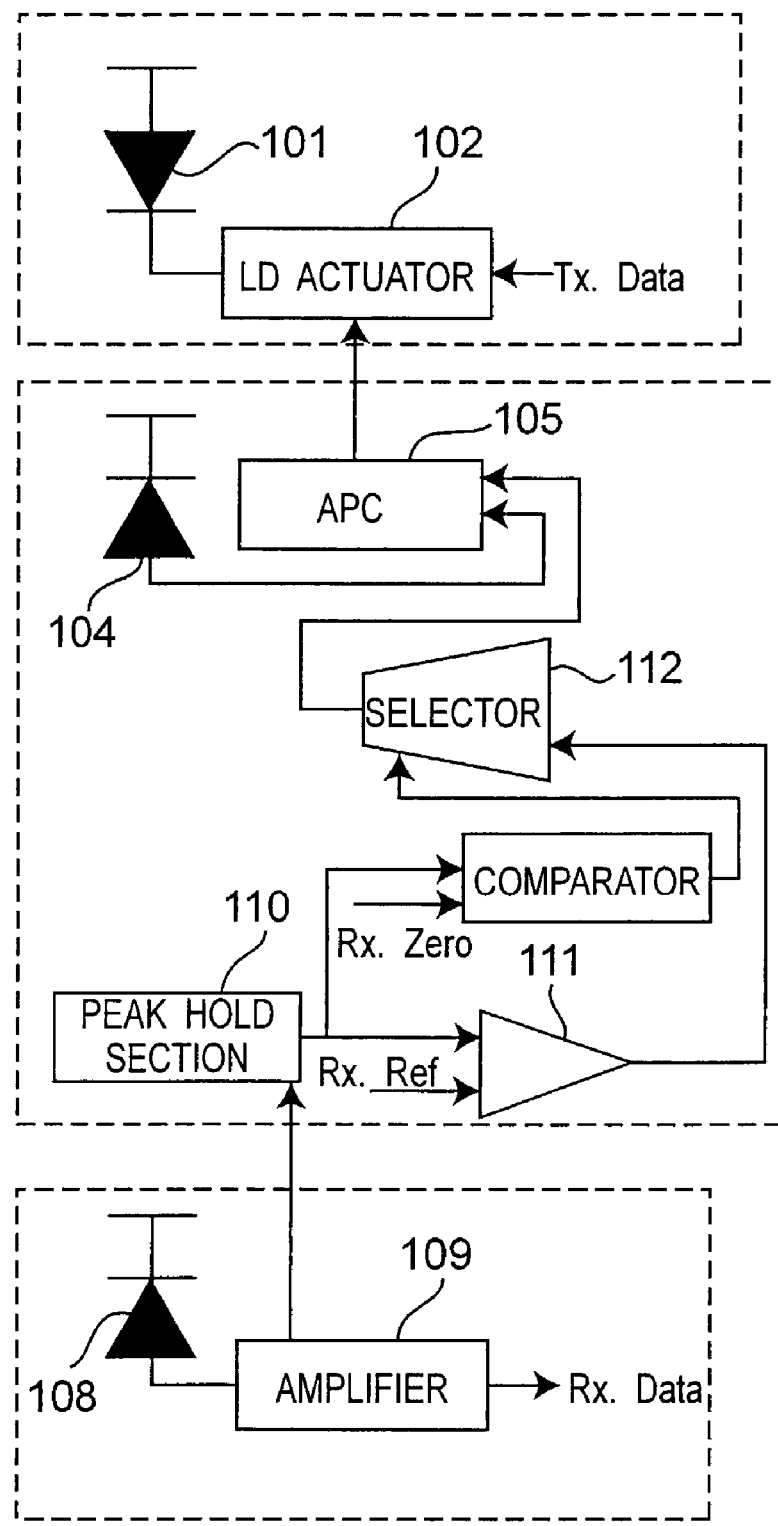
FIG. 19 shows the construction of a prior art optical communication link.

FIG. 18 shows a calculation example of losses generated in the range from the sending system to the receiving system in the case (prior art) where an LED is used as a light emitting element of the sending/receiving apparatus S100, an optical fiber of 0.14 dB/m is used, and an LD is used as a light emitting element of the counterpart sending/receiving apparatus S400. The length of the optical fiber here is 1-10 m. The losses have been computed taking account of design tolerances of optical systems.

Including variations in the wavelength and excitation NA, the total variation at the LED light source ranges from −3.7 to −8.9 dBm. In the case where an LD is used as the light emitting element, the total variation at the LD ranges from −4.9 to −7.9 dBm. As is apparent from the above, the LED light source has a large variation because the wavelengths and excitation NAs (numerical apertures) differ largely among LEDs.

It is difficult to match (make compatible) the light source consisting of the LED having a large variation and the light emitting element consisting of the LD with each other. With the allowable design value for the receiving system being in the range from −6.8 to −23.0 dBm, the loss at the receiving system in the case of the prior art is in the range from −5.5 to −22.2 dBm, i.e., overflows to a high output side.

In the third embodiment, an optical fiber having a transmission loss of 3.0-3.5 dB/m is used for a transmission distance of 1-3 meters. An optical fiber similar to that of the prior art is used for a transmission distance of 3-10 meters. FIG. 18 also shows a calculation example of losses generated in the range from the sending system to the receiving system when these optical fibers are used (present embodiment). In this embodiment of the present invention, the maximum power is less than that of the prior art by about 2.9 dBm, thus falling within the allowable design value range.

Similarly to the above case wherein transmission is performed from the S100 apparatus to the S400 apparatus, losses were computed for each of communication from the S100 sending/receiving apparatus to the S100 sending/receiving apparatus (an LED is used as a light emitting element at the sending side), from the S400 sending/receiving apparatus to the S400 sending/receiving apparatus (an LD is used as a light emitting element at the sending side), from the S400 sending/receiving apparatus to the S100 sending/receiving apparatus (an LD is used as a light emitting element at the sending side). The results were that the losses were within the allowable range.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical communications system comprising:
    a plurality of light emitting elements and a plurality of light receiving elements associated with the respective light emitting elements; and
    a plurality of optical fibers each for conveying an optical signal emitted from one light emitting element to an associated light receiving element;
    said optical fibers having respective lengths that include at least two different lengths,
    wherein the optical fibers have respective transmission losses per unit length that vary according to the lengths of the optical fibers, where the transmission losses per unit length of the optical fibers increase with decrease in transmission distance and where the transmission losses for each of the plurality of optical fibers falls within an identical specified range, where the transmission losses for each optical fiber is obtained by multiplying the respective length and the respective transmission loss per unit length corresponding to said each optical fiber.

2. The optical communications system according to claim 1, wherein optical fibers having different lengths have different transmission losses per unit length.

3. The optical communications system according to claim 1, wherein optical fibers having different lengths that fall within different ranges have different transmission losses per unit length.

4. The optical communications system according to claim 1, wherein said specified range is 6-15 dB.

5. The optical communications system according to claim 4, wherein the plurality of optical fibers have respective lengths falling within a range of from about 1 meter to about 50 meters.

6. The optical communications system according to claim 1, wherein at least one of the optical fibers has an element or a structure for adding a transmission loss thereto at an end or between opposite ends thereof.

7. The optical communications system according to claim 6, wherein said element or structure for adding a transmission loss comprises an attenuation filter made of polyimide resin and provided at the end of the optical fiber.

8. The optical communications system according to claim 6, wherein said element or structure for adding a transmission loss comprises an attenuation portion provided between the opposite ends of the optical fiber, said attenuation portion having a core diameter smaller than that of the other parts of the optical fiber.

9. The optical communications system according to claim 6, wherein said element or structure for adding a transmission loss comprises an attenuation portion provided between the opposite ends of the optical fiber, said attenuation portion having a gradually reducing fiber diameter.

10. The optical communications system according to claim 1, wherein the optical fibers are plastic optical fibers.

11. The optical communications system according to claim 1, wherein different materials are used for the optical fibers according to the lengths thereof.

12. The optical communications system according to claim 1, wherein at least one of the optical fibers has been given a flexural stress to increase transmission loss of the optical fiber.

13. The optical communications system according to claim 1, wherein at least one of the optical fibers has a bent portion or a twisted portion for increasing transmission loss of the optical fiber.

14. The optical communications system according to claim 1, wherein at least one of the optical fibers has been subjected to treatment by heat or radiant rays to increase transmission loss of the optical fiber.

15. The optical communication system according to claim 1, wherein:
    the plurality of light emitting elements and the plurality of light receiving elements are arranged so as to form a plurality of communication modules that transmit and receive information, and
    the plurality of optical fibers are arranged with respect to the plurality of communication modules for conveying an optical signal emitted from one light emitting element of one of the plurality of communication modules to an associated light receiving element of another communication module.

16. An optical communications system comprising:
    a plurality of light emitting elements and a plurality of light receiving elements associated with the respective light emitting elements;
    a plurality of optical fibers each for conveying an optical signal emitted from one light emitting element to an associated light receiving element;
    wherein the optical fibers have respective length, where at least two of the plurality of optical fibers are of different lengths; and
    wherein the transmission losses per unit length for each of the plurality of optical fibers is based on the length of said each optical fiber and so as to differ for different length cables, where the transmission losses per unit length of the optical fibers increase with decrease in transmission distance and where the transmission losses for each of the plurality of optical fibers falls within an identical specified range, where the transmission losses for each optical fiber is obtained by multiplying the respective length and the respective transmission loss per unit length corresponding to said each optical fiber.

17. The optical communication system according to claim 16, wherein:

the plurality of light emitting elements and the plurality of light receiving elements are arranged so as to form a plurality of communication modules that transmit and receive information, and the plurality of optical fibers are arranged with respect to the plurality of communication modules for conveying an optical signal emitted from one light emitting element of one of the plurality of communication modules to an associated light receiving element of another communication module.

18. An optical communications system comprising:

a plurality of light emitting elements and a plurality of light receiving elements associated with the respective light emitting elements;

a plurality of optical fibers each for conveying an optical signal emitted from one light emitting element to an associated light receiving element;

wherein the optical fibers have respective length, where at least two of the plurality of optical fibers are of different lengths; and wherein the transmission losses per unit length for each of the plurality of optical fibers is established so that the transmission loss for each of the plurality of optical fibers is within a specified range, where the transmission losses per unit length of the optical fibers increase with decrease in transmission distance and where the transmission losses for each of the plurality of optical fibers falls within an identical specified range, where the transmission losses for each optical fiber is obtained by multiplying the respective length and the respective transmission loss per unit length corresponding to said each optical fiber.

19. The optical communication system according to claim 18, wherein:

the plurality of light emitting elements and the plurality of light receiving elements are arranged so as to form a plurality of communication modules that transmit and receive information, and the plurality of optical fibers are arranged with respect to the plurality of communication modules for conveying an optical signal emitted from one light emitting element of one of the plurality of communication modules to an associated light receiving element of another communication module.

* * * * *